US012601200B2

(12) United States Patent
Pasma

(10) Patent No.: US 12,601,200 B2
(45) Date of Patent: Apr. 14, 2026

(54) LOCKSET WITH DOOR OPEN AND CLOSE SENSING

(71) Applicant: ASSA ABLOY Americas Residential Inc., New Haven, CT (US)

(72) Inventor: Kevin Pasma, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 169 days.

(21) Appl. No.: 18/150,979

(22) Filed: Jan. 6, 2023

(65) Prior Publication Data

US 2023/0212883 A1 Jul. 6, 2023

Related U.S. Application Data

(60) Provisional application No. 63/297,113, filed on Jan. 6, 2022.

(51) Int. Cl.
*E05B 47/00* (2006.01)
*E05B 51/02* (2006.01)

(52) U.S. Cl.
CPC ........ *E05B 47/0012* (2013.01); *E05B 51/023* (2013.01); *E05B 2047/0068* (2013.01)

(58) Field of Classification Search
CPC ............... E05B 47/0012; E05B 47/026; E05B 2047/0068; E05B 2047/0067; E05B 2047/0091; E05B 2047/0095; E05B 2047/0055; E05B 51/023; E05B 17/22; E05B 17/0087
USPC ........................................................ 70/278.1
See application file for complete search history.

(56) References Cited

U.S. PATENT DOCUMENTS

| | | | | |
|---|---|---|---|---|
| 6,745,982 | B2 * | 6/2004 | Lehmann | B64D 45/0059 244/129.5 |
| 7,255,376 | B2 * | 8/2007 | Pratt | E05B 51/023 292/201 |
| 9,822,553 | B1 * | 11/2017 | Ho | E05B 47/026 |
| 9,871,399 | B2 * | 1/2018 | Mittleman | E05B 63/242 |
| 10,180,319 | B2 * | 1/2019 | Singh | G01C 5/06 |
| 10,593,176 | B2 * | 3/2020 | Gangumalla | G01L 13/06 |
| 10,661,881 | B2 * | 5/2020 | Gallagher, Jr. | B64C 1/1469 |
| 10,900,780 | B2 * | 1/2021 | Seo | G01C 25/00 |
| 10,940,933 | B2 * | 3/2021 | Tendyra | E05B 17/0041 |

(Continued)

FOREIGN PATENT DOCUMENTS

| | | | |
|---|---|---|---|
| CN | 106097527 A * | 11/2016 | G07C 9/00174 |
| CN | 109339591 A * | 2/2019 | E05B 15/00 |

(Continued)

*Primary Examiner* — Steven A Tullia
(74) *Attorney, Agent, or Firm* — Merchant & Gould P.C.

(57) ABSTRACT

An electronic lockset assembly is configured to determine whether or not a door is open or closed before the lockset actuates a bolt. In one aspect, a wireless electronic lockset is disclosed. The wireless electronic lockset includes a processing unit, a bolt movable between a locked position and an unlocked position, a motor actuatable by the processing unit to move the bolt between the locked and unlocked positions, and a sensor communicatively connected to the processing unit and configured to detect air pressure. The processing unit is configured to execute instructions to receive, from the sensor, air pressure signals, and determine whether a door is closed based at least in part on a change in the air pressure reflected in the air pressure signals.

14 Claims, 9 Drawing Sheets

(56) References Cited

U.S. PATENT DOCUMENTS

| | | | | |
|---|---|---|---|---|
| 11,002,061 | B1 * | 5/2021 | Maiga | E05B 47/0001 |
| 11,008,778 | B2 * | 5/2021 | Ho | G07C 9/00174 |
| 11,043,055 | B2 * | 6/2021 | Johnson | H04N 7/186 |
| 11,257,247 | B2 * | 2/2022 | Love | G06T 7/13 |
| 11,527,118 | B2 * | 12/2022 | Lv | E05B 47/0002 |
| 2003/0127563 | A1 * | 7/2003 | LaConte | B64G 1/52 244/129.1 |
| 2007/0218823 | A1 * | 9/2007 | Wolf | G01C 5/06 454/72 |
| 2015/0027057 | A1 * | 1/2015 | Britt, Jr. | E05F 15/77 49/506 |
| 2015/0348347 | A1 * | 12/2015 | Diz | G07C 9/00896 340/5.61 |
| 2016/0343181 | A1 * | 11/2016 | Cheng | G07C 9/00309 |
| 2016/0348398 | A1 * | 12/2016 | Telljohann | G08B 13/08 |
| 2018/0108192 | A1 * | 4/2018 | Ho | G07C 9/253 |
| 2019/0088098 | A1 * | 3/2019 | Gangumalla | G01L 27/005 |
| 2019/0352930 | A1 * | 11/2019 | Beck | E05B 17/22 |
| 2020/0349787 | A1 * | 11/2020 | Ho | G07C 9/37 |
| 2022/0307315 | A1 | 9/2022 | Paulsson | |
| 2023/0042058 | A1 * | 2/2023 | N'Guessan | G07C 9/00563 |
| 2023/0072967 | A1 * | 3/2023 | Lv | G07C 9/00817 |
| 2023/0212882 | A1 * | 7/2023 | Maiga | E05B 47/0603 70/279.1 |

FOREIGN PATENT DOCUMENTS

| | | | | | |
|---|---|---|---|---|---|
| CN | 109630196 | A | * | 4/2019 | E05B 47/0012 |
| CN | 112737471 | A | * | 4/2021 | H02H 7/085 |
| CN | 114458098 | A | * | 5/2022 | E05B 17/22 |
| DE | 102007050596 | A1 | * | 4/2009 | E05B 47/0611 |
| DE | 102019110347 | A1 | * | 10/2020 | E05B 41/00 |
| EP | 0799962 | A1 | * | 10/1997 | E05F 15/73 |
| KR | 102182839 | B1 | * | 11/2020 | E05B 15/024 |
| TW | _1757201 | | * | 3/2022 | E05B 17/22 |
| TW | 1757201 | B | * | 3/2022 | E05B 17/22 |
| WO | WO-2008101928 | A1 | * | 8/2008 | E05C 17/30 |
| WO | WO-2014154738 | A1 | * | 10/2014 | E05B 39/00 |
| WO | WO-2020254141 | A1 | * | 12/2020 | E05F 15/77 |
| WO | WO-2020260084 | A1 | * | 12/2020 | E05F 15/71 |
| WO | WO-2020261161 | A9 | * | 2/2021 | |

* cited by examiner

LOCKSET WITH DOOR OPEN AND CLOSE SENSING

CROSS-REFERENCE TO RELATED APPLICATION

This application claims the benefit of U.S. Provisional Application Ser. No. 63/297,113, filed Jan. 6, 2022, the disclosure of which is hereby incorporated by reference in its entirety.

TECHNICAL FIELD

This invention relates to the field of door locks. More particularly, this invention relates to features on electronic door locks.

BACKGROUND

Wireless electronic locksets for residential and commercials premises, e.g., at exterior doors, are becoming increasingly popular for user convenience. For example, certain types of wireless electronic locksets may await a signal from a mobile device of a user to actuate an unlocking operation at a door. Other types of devices may allow actuation (e.g., unlocking) of the lockset if an authorized mobile device is within proximity of the lockset. Still further, types of wireless electronic locksets receive a code at a keypad.

However, these existing wireless electronic locksets have drawbacks with respect to security and convenience. For example, even though a door is locked, it may be not closed. If the lockset has no way of determining if the door is closed, the electronic lockset is only able to determine that the door is locked. A locked, but not closed, door provides no security. To address this problem, complex, multi-piece devices have been used in addition to locksets. For example, additional sensors may be added to doors or windows.

Other devices use magnets to determine if a door is closed, but there are drawbacks as a magnet needs to be added outside the lock on the jamb for lock to recognize the position. The lock can believe it is closed when it is not because the angle of the lock to magnet does not provide the best resolution.

SUMMARY

The present disclosure relates generally to electronic locksets, and in particular, to a locking confirmation assembly usable within an electronic lockset.

In a first aspect, a wireless electronic lockset is disclosed. The wireless electronic lockset includes a processing unit, a locking bolt movable between a locked and unlocked position, a motor actuatable by the processing unit to move the locking bolt between the locked and unlocked positions, and a sensor communicatively connected to the processing unit and configured to detect air pressure. The processing unit is configured to execute instructions to receive, from the sensor, air pressure signals, and determine whether a door is closed based at least in part on a change in the air pressure reflected in the air pressure signals.

In another aspect, a method of using a wireless electronic lockset is disclosed. The method includes requesting air pressure signals from a sensor in the wireless electronic lockset, receiving air pressure signals from the sensor, detecting a change in air pressure based on the air pressure signals, and determining whether a door is closed based on a detected change in the air pressure.

In another aspect, a wireless electronic lockset system is disclosed. The wireless electronic lockset system includes a door assembly comprising an external assembly comprising a keypad and a latch assembly. The latch assembly comprises a locking bolt movable between a locked and unlocked positions. The door assembly further comprises an internal assembly. The internal assembly comprises a processing unit, a motor actuatable by the processing unit to move the locking bolt between the locked and unlocked positions, and at least one sensor. The at least one sensor is configured to detect air pressure and determining whether a door is closed based on a change in the air pressure.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
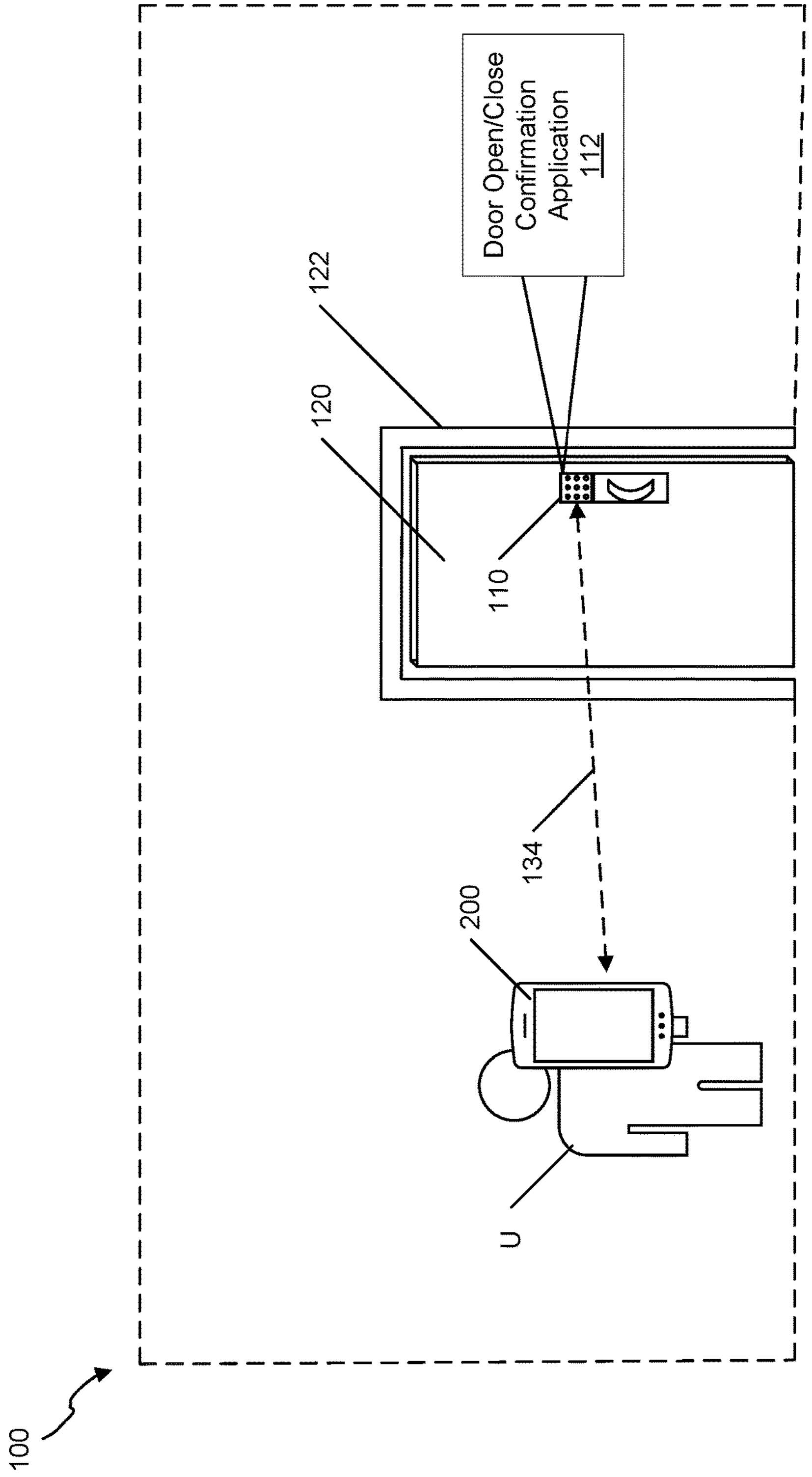
FIG. 1 illustrates an environment in which aspects of the present disclosure may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure generally relates to an electronic lockset with certain features, and in particular, to a locking confirmation assembly usable within such an electronic lockset. The term "electronic lockset" or "electronic lock assembly" is broadly intended to include any type of lockset that uses electrical power in some manner, including but not limited to, electronic deadbolts, electronic lever sets, etc. This disclosure encompasses the integration of one or more features described herein into any type of electronic lockset and is not intended to be limited to any particular type of electronic lock. The term "locking confirmation assembly" generally refers to at least a portion of an electronic lockset that includes at least a sensor.

The electronic lockset includes a deadbolt or other electronic locking mechanism. In an embodiment, a keypad receives physical input of a numerical or alphabetical code, or a personalized code such as a fingerprint. In another embodiment, the lockset receives a communication from a mobile device. Input of the correct code or an authentic request communicates a signal to the electromechanical locking mechanism to lock or unlock the door. The electronic lockset is also able to indicate whether or not the door is closed, and whether or not the door is locked. In some examples, the electronic lockset tracks a door state which includes whether the door is currently opened or closed and whether the door is locked or unlocked. In some embodiments, the door state is tracked using a virtual lock data structure.

According to some example embodiments, the electronic lockset provides for secure electronic access at an electronic lock assembly, while also assuring that the door is closed before being locked. In an example, the electronic lockset receives a request to lock the door, but before the locking bolt is actuated, the electronic lockset confirms that the door is closed. Various sensors are used individually or in combination to determine if the door is closed. Examples of such sensors include pressure sensors and motion sensors. A microphone can also be used alone or in combination with the sensors. If the electronic lockset determines that the door is closed, then the bolt is actuated. If the electronic lockset determines that the door is not closed, an alert notifies the user.

FIG. 1 illustrates an environment 100 in which aspects of the present disclosure may be implemented. In the embodiment shown, the environment 100 includes an electronic lockset 110 (also referred to herein as a "wireless electronic lockset"), a door 120, a door jamb 122, a mobile device 200 communicating 134 with the electronic lockset 110. The electronic lockset includes a door open/close confirmation application 112. Also shown is a user U.

In this embodiment, a user U has a phone or other mobile device 200 with wireless communication capabilities. Although not shown, in another embodiment, the user may input a code to a keypad. The user U is an authorized person desiring to unlock (or lock) a door 120. The door 120 includes a wireless electronic lockset 110.

The mobile device 200 is capable of communicating 134 with the wireless electronic lockset 110. Such communication can optionally occur via one or more wireless communication protocols, e.g., Wi-Fi (IEEE 802.11), short-range wireless, Bluetooth® Zigbee®, a cellular network, a wireless local area network, near-field communication protocol, etc. Accordingly, the electronic lockset 110 could communicate directly with the mobile device 200 or use a wireless gateway, and/or coordinate with other networking devices. In some embodiments, the mobile device 200 is capable to communicating with the electronic lockset 110 via a key server. In these embodiments, the electronic lockset 110 is also capable of communicating with the key server. Examples of the key server include a physical server, or a virtual server hosted in a cloud storage environment. The key server stores a value or key used to authenticate the mobile device 200 when attempting to unlock the door 120. In alternative embodiments, authentication between the wireless electronic lockset 110 and the mobile device 200 can be performed independently of a key server. The wireless electronic lockset 110 may also be locked and unlocked manually by a user.

The electronic lockset 110 includes a door open/close confirmation application 112. The door open/close confirmation application operates to determine whether the door 120 is open or closed relative to door jamb 122. In some embodiments, the door open/close confirmation application 112 includes instructions which cause the electronic lockset 110 to use one or more different sensors to detect events which may have an impact on the state of the door. In some examples, the door open/close confirmation application 112 is configured to operate with a microphone to detect sounds of a door opening or closing. The detected sounds are used to determine the state of the door. In the typical embodiment, the door open/close confirmation application 112 is stored and executed on the electronic lock. However, in other embodiments the door open/close confirmation application is cloud based and is configured to instruct the electronic lock remotely. In some embodiments, the door open/close confirmation operates to ensure that the door is closed and securely locked when intended by the user U. Additionally, the door open/close confirmation application also operates to cause the electronic lockset to notify or alert a user U based on the state of the door. Further examples of the door open/close confirmation application 112 are described herein.

In some examples, the electronic lockset 110 includes a pressure sensor. In some of these embodiments, the electronic lockset 110 determines the door is closed based on the pressure sensor detecting a change in pressure. In some examples, the change in pressure between an open door and a closed door is a constant variable which the electronic lockset can use to detect a door close or door open event. In some embodiments, the pressure sensor can also detect whether the door is sealed.

In some embodiments, the electronic lockset 110 includes a microphone. In some of these embodiments, the electronic lockset 110 determines that the door is closed based on the microphone detecting the sound of a door closing. For example, a door may make a specific sound that is unique to a door close or door open event.

In further embodiments, the electronic lockset 110 includes a pressure sensor and a microphone. In some of these embodiments, the electronic lockset 110 may use a change in pressured detected by the pressure sensor to determine if the door is closed and use the microphone to confirm that the door is closed. In some examples, the pressure sensor may not detect the door closing (e.g., false negative) or incorrectly detect the door closing (e.g., false positive). For example, when a window inside a house is open, the pressure sensor may not detect a change in pressure above the determined threshold. In this example, the microphone can act as a back-up to catch the door closing event.

In further examples, the electronic lockset 110 further includes a motion sensor. In some of these examples, the detected motion causes the electronic lockset 110 to activate or turn on the pressure sensor and/or the microphone. In some embodiments, the information collected by the motion sensor is further used to help determine whether the door is in an open or closed state.

Figure 2:
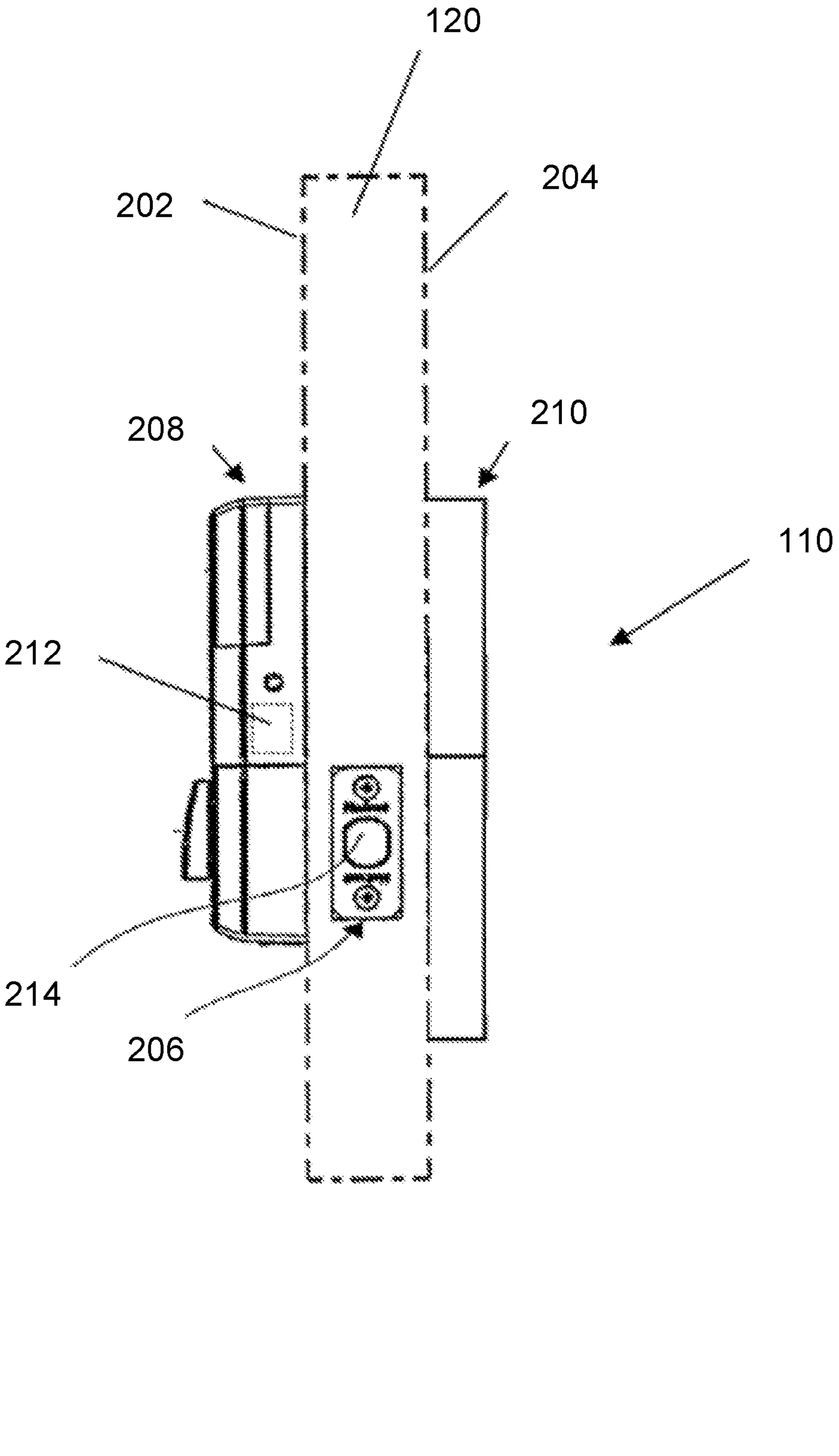
FIG. 2 illustrates a side perspective view of a wireless electronic lockset assembly.
Figure 3:
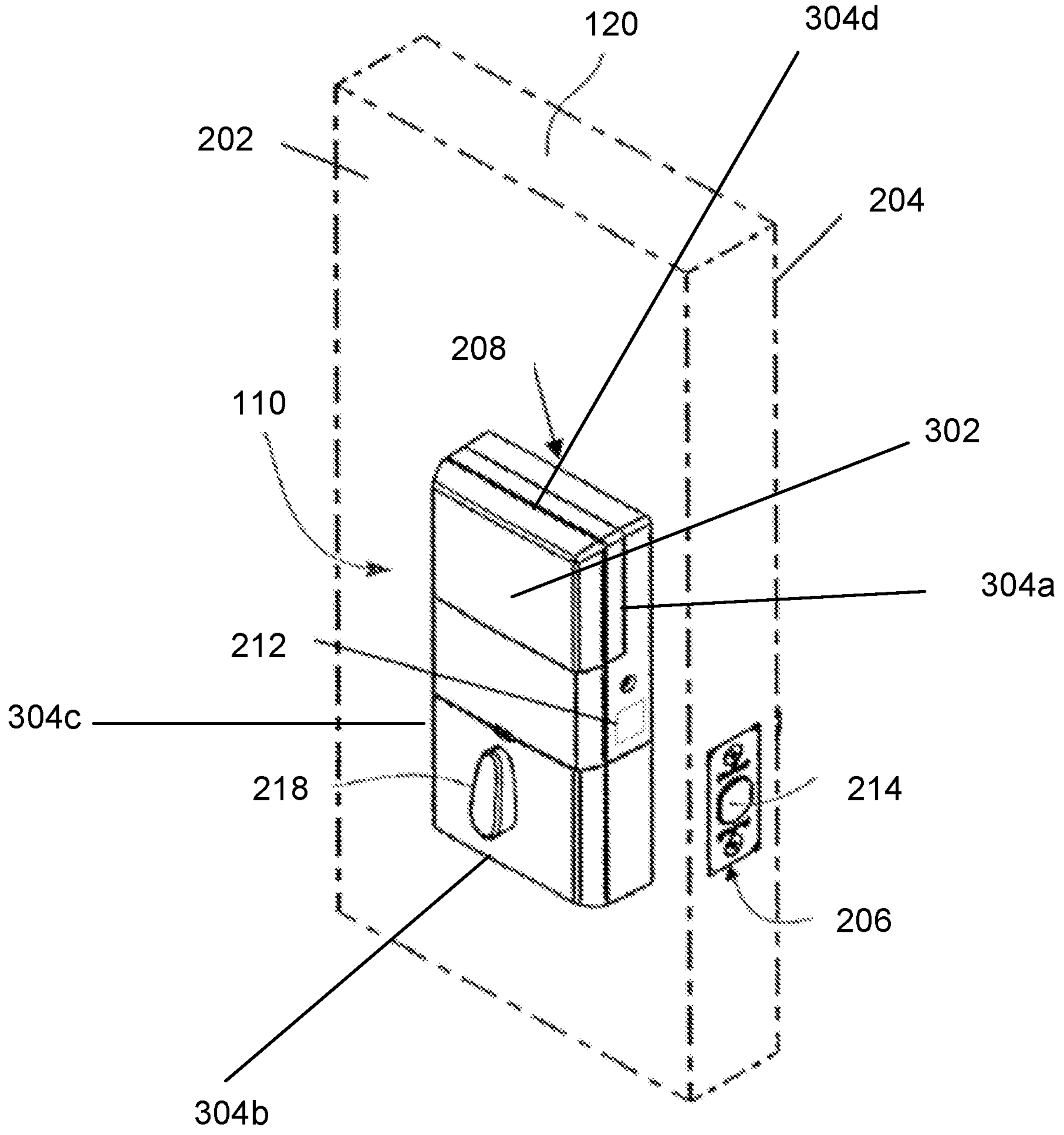
FIG. 3 illustrates an interior perspective view of a wireless electronic lockset assembly.
Figure 4:
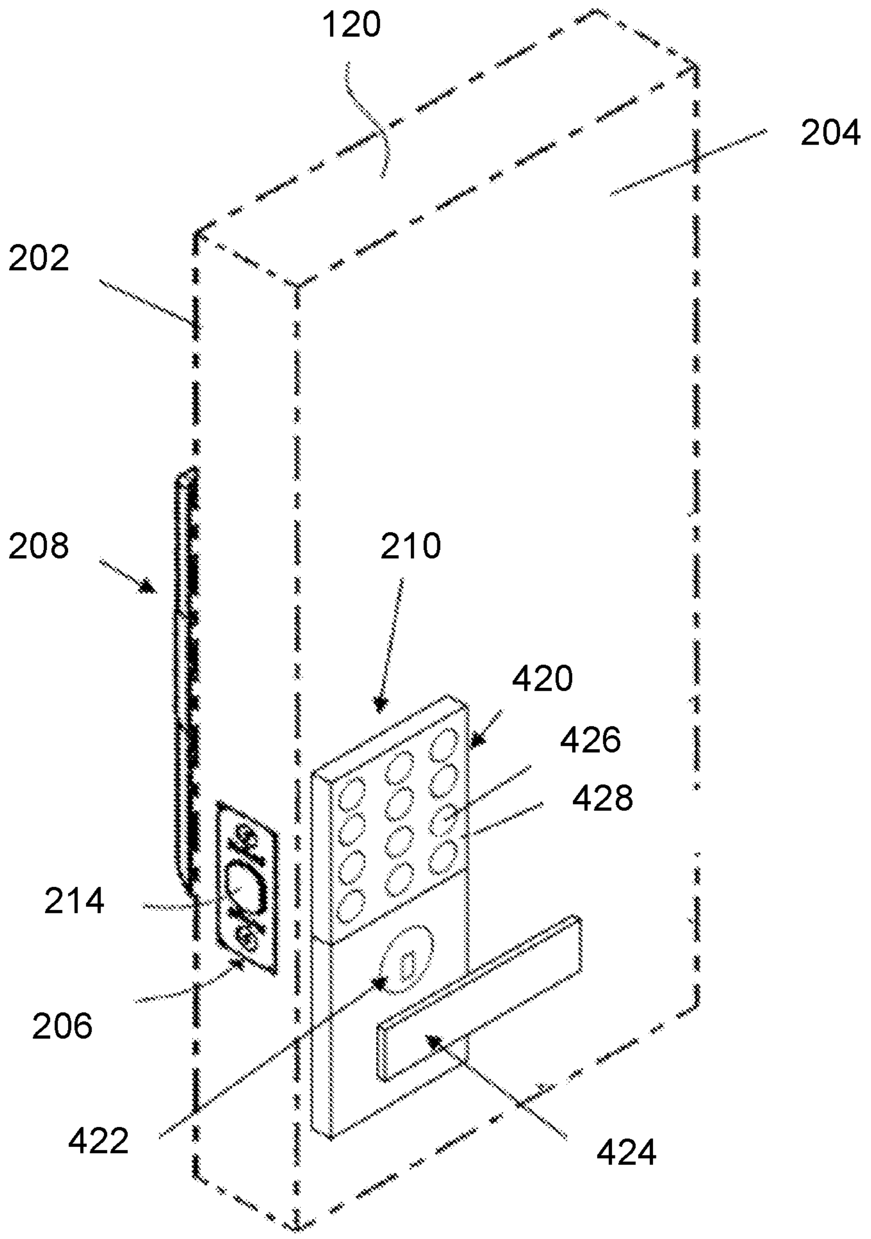
FIG. 4 illustrates an exterior perspective view of a wireless electronic lockset assembly.

FIGS. 2-4 illustrate the electronic lockset 110 (also referred to herein as a "wireless electronic lockset") mounted to a door 120, according to one example of the present disclosure.

The door 120 has an interior side 202 and an exterior side 204. The electronic lockset 110 includes an interior assembly 208, an exterior assembly 210, and a latch assembly 206. The latch assembly 206 is shown to include a bolt 214 that is movable between an extended position (locked) and a retracted position (unlocked, shown in FIGS. 2-4). Specifically, the bolt 214 is configured to slide along a longitudinal axis in a first direction when the bolt 214 is retracted, and the door 120 is in an unlocked state. When the bolt 214 is extended along the longitudinal axis in an opposing direction, the bolt 214 protrudes from the door 120 into a door jamb (e.g. FIG. 1, as shown in FIG. 1) to place the door 120 in a locked state.

The interior assembly 208 comprising the interior electronics is mounted to the interior side of the door 120, and the exterior assembly 210 comprising the exterior electronics is mounted to the exterior side of the door 120. The latch assembly 206 is typically at least partially mounted in a bore formed in the door 120. The term "outside" is broadly used to mean an area outside the door 120 and "inside" is also broadly used to denote an area inside the door 120. With an exterior entry door, for example, the exterior assembly 210 may be mounted outside a building, while the interior assembly 208 may be mounted inside a building. With an interior door, the exterior assembly 210 may be mounted inside a building, but outside a room secured by the electronic lockset 110, and the interior assembly 208 may be mounted inside the secured room. The electronic lockset 110 is applicable to both interior and exterior doors. The electronic lockset 110 may also be used on windows and other similar structures.

In some examples, the interior assembly 208 includes a processing unit/firmware (shown schematically at FIG. 5) containing electronic circuitry for the electronic lockset 110. The interior assembly 208 includes a processing unit 212 (shown schematically) containing electronic circuitry for the electronic lockset 110. The processing unit 212 is operable to execute a plurality of software instructions (i.e., firmware) that, when executed by the processing unit 212, cause the electronic lockset 110 to implement the methods and otherwise operate and have functionality as described herein. The processing unit 212 may comprise a device commonly referred to as a processor, e.g., a central processing unit (CPU), digital signal processor (DSP), or other similar device and may be embodied as a standalone unit or as a device shared with components of the electronic lockset 110. The processing unit 212 may include memory communicatively interfaced to the processor, for storing the software instructions. Alternatively, or the electronic lockset 110 may further comprise a separate memory device for storing the software instructions that is electrically connected to the processing unit 212 for the bi-directional communication of the instructions, data, and signals therebetween.

In some embodiments, the memory stores instructions for a door open/close confirmation application 112. The door open/close confirmation application 112, when executed by the processing unit 212, causes the locking system to determine the current state of the door. For example, the door open/close confirmation application 112 operates to determine whether the door is in an open state or a closed state. Examples of such an application are described herein.

Referring to FIG. 3, the interior assembly 208 is mounted on the interior side 202 of the door 120. The interior assembly 208 can include a processing unit/firmware (shown schematically at FIG. 5) containing electronic circuitry for the electronic lockset 110. In some examples, the interior assembly 208 includes a manual turn piece 218 that can be used on the interior side of the door 120 to move the bolt 214 between an extended position and a retracted position. As shown in the example, the interior assembly 208 extends outward from door 120. In this example, the interior assembly 208 is generally a rectangular shape and includes a face extending out from four sides 304*a*, 304*b*, 304*c*, 304*d*, which extends out from the door. Extending side 304*a* is facing a door jamb (not shown).

Referring to FIG. 4, the exterior assembly 210 is shown mounted on the exterior side 204 of the door 120. The exterior assembly 210 can include exterior circuitry communicatively and electrically connected to the processing unit (not shown). For example, the exterior assembly 210 can include a keypad 420 for receiving a user input and/or a keyway 422 for receiving a key (not shown). The exterior side of the exterior assembly 210 can also include a handle 424. In some examples, the exterior assembly 210 includes the keypad 420 and not the keyway 422. In other examples, the exterior assembly 210 includes the keyway 422 and not the keypad 420. In further examples, the exterior assembly 210 includes the keyway 422 and the keypad 420. When a valid key is inserted into the keyway 422, the valid key can move the bolt 214 between the extended and retracted positions. When a user inputs a valid code into the keypad 420, the bolt 214 is moved between the extended and retracted positions. The bolt 214 can also move between the extended and retracted positions when signal is detected from a mobile device.

In other embodiments, the exterior assembly 210 includes a touch panel. The touch panel is capable of receiving input in the form of tactile touch from a user. In a first example, the input is a passcode, such as a numerical passcode, or fingerprint identification.

In some examples, the exterior assembly 210 is electrically connected to the interior assembly 208. Specifically, the keypad 420 is electrically connected to the interior assembly 208, specifically to the processing unit (not shown), by, for example, an electrical cable (not shown) that passes through the door 120. When the user inputs a valid code via keypad 420 or send a valid request from a mobile device that is recognized by the processing unit, an electrical motor is energized to retract the bolt 214 of the latch assembly 206, thus permitting the door 120 to be locked or unlocked. Still further, an electrical connection between the exterior assembly 210 and the interior assembly 208 allows the processing unit 216 to communicate with other features included in the exterior assembly 210, as noted below.

The keypad 420 can be any of a variety of different types of keypads. The keypad 420 can be one of a numeric keypad, an alpha keypad, and/or an alphanumeric keypad. The keypad 420 can have a plurality of characters 426 displayed thereon. For example, the keypad 420 can include a plurality of buttons that can be mechanically actuated by the user (e.g., physically pressed). In some examples, the keypad 420 includes a touch interface 428, such as a touch screen or a touch keypad, for receiving a user input. The touch interface 428 is configured to detect a user's "press of a button" by contact without the need for pressure or mechanical actuation.

Figure 5:
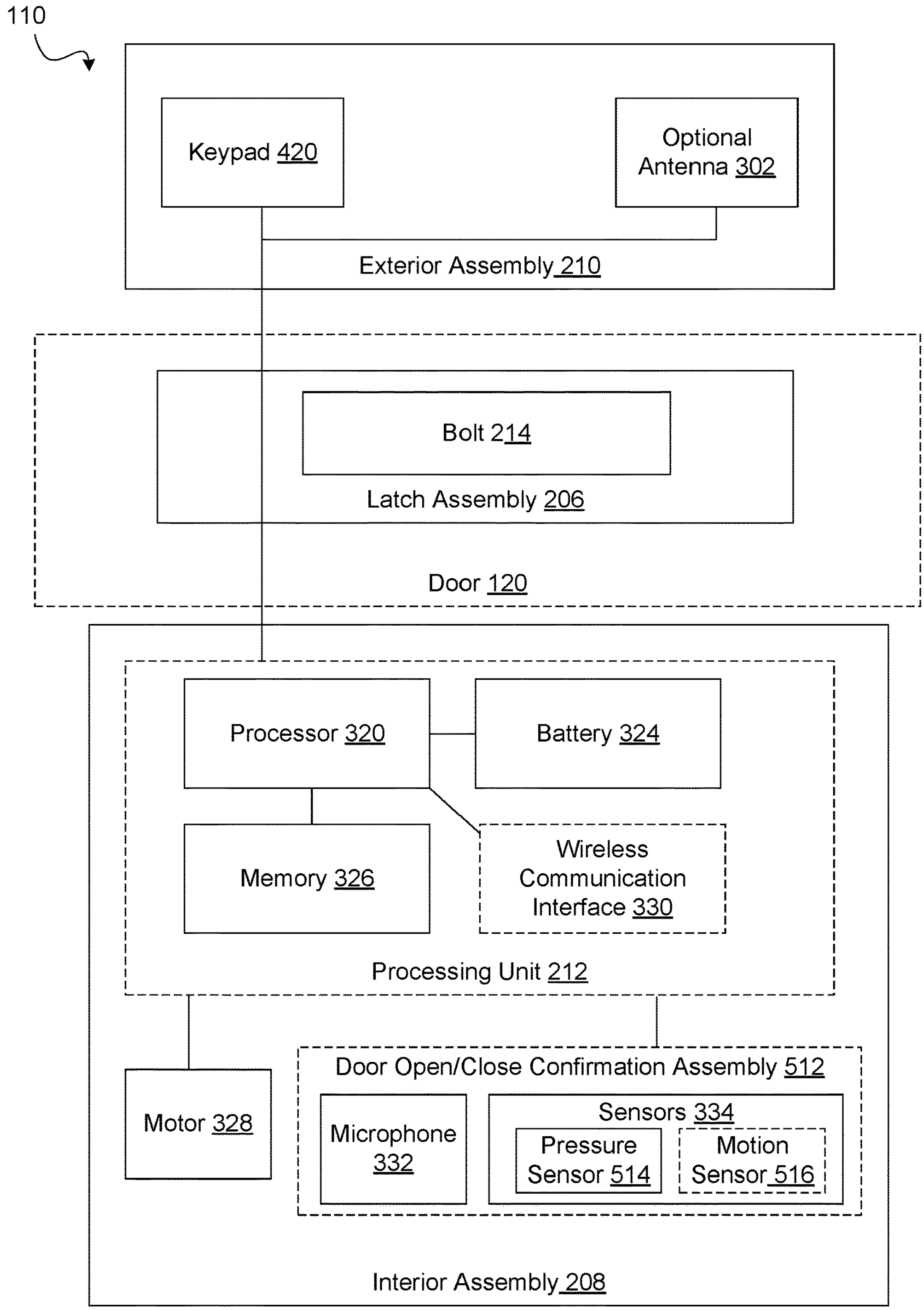
FIG. 5 illustrates a schematic representation of a wireless electronic lockset.

FIG. 5 is a schematic representation of the electronic lockset 110. The schematic includes a block diagram of the interior assembly 208, the exterior assembly 210, and the latch assembly 206.

The exterior assembly 210 is shown to include a keypad 420, and an optional antenna 302. The keypad 420 receives a physical input, such as a numerical or alphabetical code, or a personalized code such as a fingerprint. The keypad 420 may include a plurality of buttons that can be mechanically actuated by the user. Alternatively, the keypad 420 may be a single screen touch pad.

A touch activation capability can be used to initiate a process to lock/unlock the lock and/or otherwise provide input. In some embodiments, for example, the entire outside cover of the lock is touch sensitive and allows a user to touch the lock to activate various functions of the lockset. This capability is unique because it does not require any special keypad area, button press, or glass capacitive touch sensor area, but rather allows the entire diameter of the lockset cover to act as a capacitive touch sensor for activation.

The optional antenna 302 is capable of receiving a signal from a mobile device. When the antenna 302 receives a signal, it processes the signal and sends it to the processing unit for confirmation of an authorized user. In an embodiment, the antenna 302 is used instead of the keypad 420. When the antenna 302 receives a signal from an authorized user, the lockset actuates.

As described above, the interior assembly 208 includes the processing unit 212. The interior assembly 208 also includes a motor 328, a microphone 332, and sensors 334 The sensors 334 include a pressure sensor 514 and a motion sensor 516.

The processing unit 212 comprises a processor 320, battery 324, and memory 326. The processor 320 is communicatively connected to the memory 326, and the battery 324. The processing unit 212 is located within the interior assembly 208 and is capable of operating the electronic lockset 110, e.g., by actuating the motor 328 to actuate the bolt 214.

The processing unit 212 is operable to execute software instructions (e.g., firmware) that, when executed by the processing unit 212, cause the electronic lockset 110 to implement the methods and otherwise operate and have functionality as described herein. The processing unit 212 may comprise a device commonly referred to as a processor 320, e.g., a central processing unit (CPU), digital signal processor (DSP), or other similar device and may be embodied as a standalone unit or as a device shared with components of the electronic lockset 110. The processing unit 212 may include memory communicatively interfaced to the processor 320, for storing the software instructions. Alternatively, the electronic lockset 110 may further comprise a separate memory device for storing the software instructions that is electrically connected to the processing unit 212 for the bi-directional communication of the instructions, data, and signals therebetween.

In some examples, the processor 320 can process signals received from a variety of devices to determine whether the electronic lockset 110 should be actuated. Such processing can be based on a set of preprogramed instructions (e.g., firmware) stored in the memory 326. In some examples, the processing unit 212 is configured to capture a keypad input event from a user and store the keypad input event in the memory 326. In other examples, the processor 320 receives a signal from the keypad 420 and can validate received passcode in order to actuate the electronic lockset 110.

The memory 326 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

In some examples, the memory 326 stores instructions for a door open/close confirmation application 112. The door open/close confirmation application 112 when executed by the processor 320 causes the electronic lockset 110 to determine whether the door is in an open or closed state. Examples of the door open/close confirmation application 112 are described herein.

In some examples, the electronic lockset 110 can wirelessly communicate with external devices through a wireless communications interface 330. In some examples, an external device can wirelessly control the operation of the electronic lockset 110, such as operation of the bolt 214. The electronic lockset 110 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lockset 110 can wirelessly communicate with networked and/or distributed computing systems, such as may be present in a cloud-computing environment. Such communication may be facilitated, e.g., by an RF circuit.

The processing unit 212 also includes the battery 324 to power the electronic lockset 110. In one example, the battery 324 may be a standard single-use (disposable) battery. Alternatively, the battery 324 may be rechargeable.

The interior assembly 208 includes a motor 328 that is capable of actuating the bolt 214. In use, the motor 328 receives an actuation command from the processing unit 212, which causes the motor 328 to actuate the bolt 214 from the locked position to the unlocked position or from the unlocked position to the locked position. In some examples, the motor 328 actuates the bolt 214 to an opposing state. In some examples, the motor 328 receives a specified lock or unlock command, where the motor 328 only actuates the bolt 214 if the door 120 is closed. For example, if the door 120 is open and the motor 328 receives a lock command, then the bolt 214 is not actuated and instead an alert command sent. If the door 120 is closed and the motor 328 receives a lock command, then the bolt 214 is actuated.

The interior assembly 208 includes a door open/close confirmation assembly 512. In some examples the door open/close confirmation assembly 512 is part of or works with a door locked confirmation assembly which confirms whether a door is closed. In some examples, the locking confirmation assembly includes a motor 328, a microphone 332, and sensors 334. In some examples, the sensors 334 include a pressure sensor 514 and a motion sensor 516.

Although not required, the door open/close confirmation assembly 512 may include the microphone 332. In some examples, a door open/close confirmation application 112 is configured to receive signals from the microphone 332. In these examples, the application may determine whether the microphone detected a sound that the door makes when it is closed. In some of these examples, the door open/close confirmation application 112 is trained to detect specific sounds a door makes when it is closed. For example, the sound of a door closing may have audio features which are unique and specific to the door closing.

In some embodiments, the microphone 332 is used in combination with the pressure sensor 514. In these examples, the microphone 332 may be used as a back up for detecting whether a door is closed. For example, the pressure sensor 514 may not detect a change in pressure when the door is closed because a window or side door was left open inside the room or house. In some embodiments, the microphone is used in combination with the pressure sensor 514 to prevent false positive or false negative events.

In some embodiments, the door open/close confirmation assembly 512 includes sensors 334. The sensors 334 can include a pressure sensor 514 and a motion sensor 516.

The pressure sensor 514 is capable of determining an open or closed state of the door based on a change in air pressure. In some examples, the change in air pressure is a constant variable that is associated with a door close event. The door open/close confirmation application 112 receives air pressure readings from the pressure sensor 514 which are used to determine whether the door was closed. For example, the pressure sensor 514 can detect a change in air pressure above a threshold indicating that the door has been opened or closed. In some examples, this threshold is a constant variable specific to the door. In some embodiments, the air pressure may further indicate that the door is or is not properly sealed. Determining whether the door is properly sealed can also be used to prevent the initiating the locking procedure prematurely.

In some embodiments, the door open/close confirmation application 112 relies solely on the readings from the pressure sensor 514. In other embodiments, the readings from the pressure sensor 514 and the microphone 332 are used in combination. In further embodiments, the motion sensor 516 can also be used in various combinations with the microphone 332 and the pressure sensor 514. In some examples, the data collected by the various sensors is compiled and used to train a model to detect a door close event. In some examples, a model is calibrated when configuring the door open/close confirmation application 112 or as part of the installation of the lock.

In examples, the model used to detect a door open/close event may be implemented using a trained convolutional neural network (CNN) model. Such a model may be trained using sample pressure and/or sound readings, or combination thereof, for door opening and closing events in a plurality of different environments, to capture the various possibilities of sound and pressure responses that may occur with different door installations. Such models may be built for environmental event sound recognition (ESC), and may be used to classify sounds as to presence of, and confidence in, detection of a door opening or closing event. In some examples, a CNN-based model may be used and may incorporate a max-pooling layer. In further examples, such a model may use further feedback received after installation (e.g., based on user confirmation of a door opening and closing event to validate detection), and may update a version of the model local at the electronic lockset 110, or at a remote model that may subsequently be sent back to the lockset as part of a software update.

In still further example embodiments, the interior assembly 208 can include a motion sensor 516. Using such a motion sensor 516 (e.g., an accelerometer, gyroscope, magnetometer or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lockset 110 to perform certain processing, e.g., to turn on the pressure sensor 514.

For example, in some embodiments, the pressure sensor 514 and/or microphone 332 are turned off until the door open/close confirmation application 112 detects an event which indicates a change in the door state. In some examples, the movement of the door detected by the motion sensor 516 indicates that the door may change states. Accordingly, the door open/close confirmation application 112 may instruct the pressure sensor 514 and/or the microphone 332 to turn on in order to detect the change state. In some examples, the data collected by the motion sensor 516 is further used to train a model for detecting a door close event or other door state changes.

Referring to FIGS. 2-5 generally, in example embodiments, the electronic lockset 110 may be used on both interior and exterior doors. Described are non-limiting examples of a wireless electronic lockset 110. It should be noted that the electronic lockset 110 may be used on other types of doors, such as a garage door or a doggie door, or other types of doors that require an authentication process to unlock (or lock) the door, or windows.

In some embodiments, the electronic lockset 110 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

The electronic lockset 110 includes a latch assembly 206, which is located between the exterior assembly 210 and interior assembly 208. For example, the latch assembly 206 may be located within a bore in the door 120. The latch assembly 206 also includes communication means to connect the exterior assembly 210 to the interior assembly 208.

The latch assembly 206 is shown to include a bolt 214, such as a locking bolt, that is movable between an extended position (locked) and a retracted position. Specifically, the bolt 214 is configured to slide along a longitudinal axis and, when the bolt 214 is retracted, the door 120 is in an unlocked state. When the bolt 214 is extended, the bolt 214 protrudes from the door 120 into a door jamb (e.g., the door jamb 122 in FIG. 1) to place the door in a locked state. The bolt 214 defines a longitudinal axis, which extends generally parallel to the ground from a door to a door frame.

Figure 6:
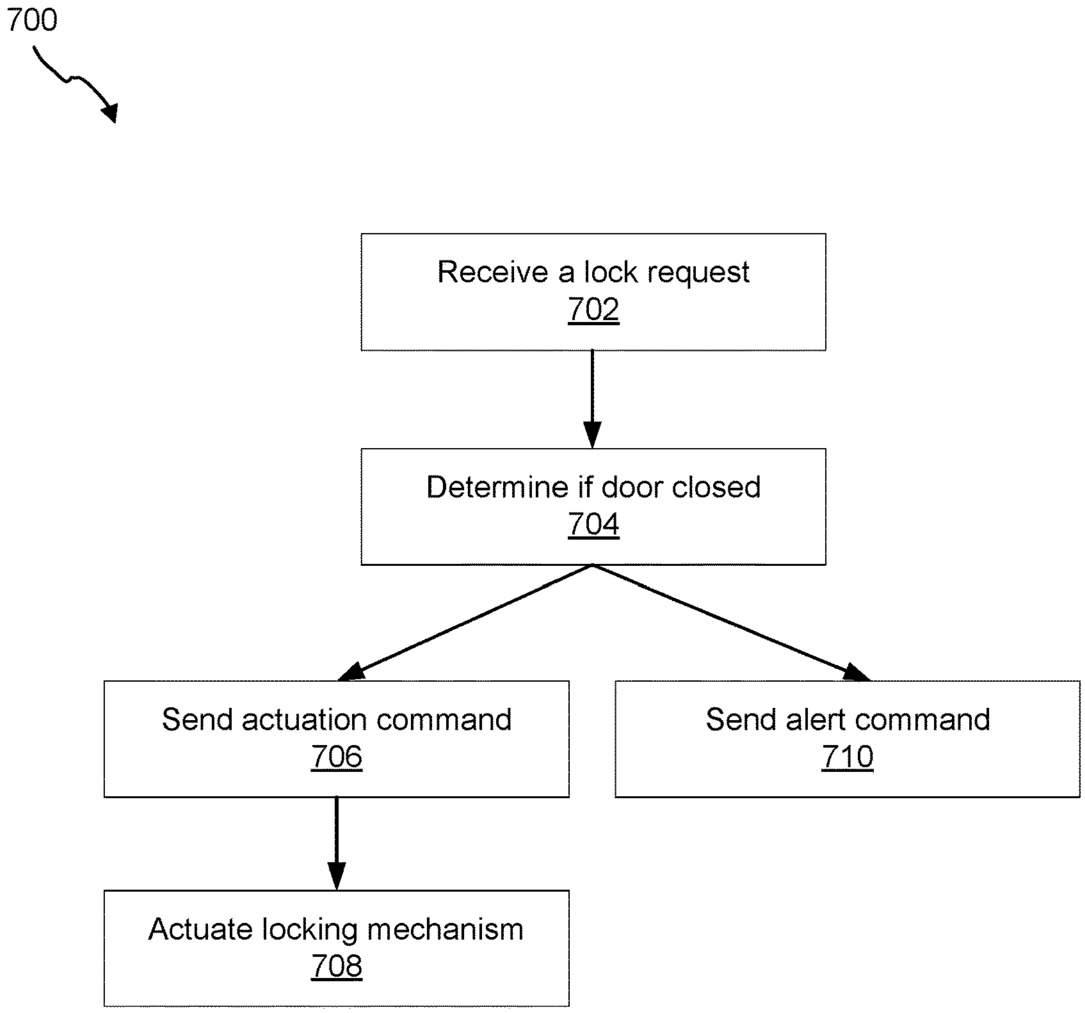
FIG. 6 illustrates an example flowchart of a method of confirming a door locking process.

FIG. 6 illustrates an example method 700 of using an electronic lockset 110 as described herein. The method 700 includes the operations 702, 704, 706, 708, and 710.

At operation 702, a lock request is received. The lock request may be received numerous ways. In a first example, a code is entered into the keypad 420. In another example, a user using a mobile device 200 sends a request to lock the lockset. After the electronic lockset 110 receives a lock request, the electronic lockset 110 must determine if the door 120 itself is closed.

At operation 704, the electronic lockset determines if the door 120 is closed using the pressure sensor 514 and/or microphone 332. If the door is determined to be closed, then the method moves to step operation. If the door is determined to not be closed, then the method moves to operation 710. In alternative embodiments, the electronic lockset tracks a current state of a door. In these examples the operation 704 checks the current door state to determine if the door is closed. The door state is updated when a sensor detects some change which indicates a change in state. For example, a locked door may be unlocked, the sensor confirming the locked state may pick up a change or the change may automatically be applied based on a received command from a user. In a further example, when a door is in an open state moving to a closed state, a motion sensor may detect that the door is moving and turn on a pressure sensor and/or a microphone. These instruments may detect a change in pressure or a sound which indicates that the door is in a closed state and update the state accordingly.

At operation 706, if the door 120 is determined to be closed, the processing unit 212 sends an actuation command. The actuation command signals to the latch assembly 206 that the bolt 214 can be actuated. The operation 706 initiates the locking process when it is confirmed that the door is closed, and thus able to lock.

At operation 708, the bolt 214 is actuated. In some embodiments, actuating the bolt 214 comprises utilizing the motor 328 to extend the bolt 214 into a strike plate located in a door jamb 122. In some embodiments, a user will receive a notification on a mobile device indicating that the door was successfully locked. In other examples, the electronic lockset may present this notification audibly or visually using connected electronics, such as making a noise that a user can recognize or turning on a light that indicates to a user that the lockset is locked.

At operation 710, if it is determined that the door 120 is not closed, then an alert command notifying the user that the lock request cannot be completed as requested, is sent. An alert command may be sent numerous ways. In a first example, the lockset itself sends an alert command, such as making a noise that a user can recognize or turning on a light that indicates to the user that the lockset is not locking, even after a locking command has been received. In another example, the alert command may be sent to the user's mobile device. The message notifies the user that the locking request cannot be completed because the door is not closed.

Figure 7:
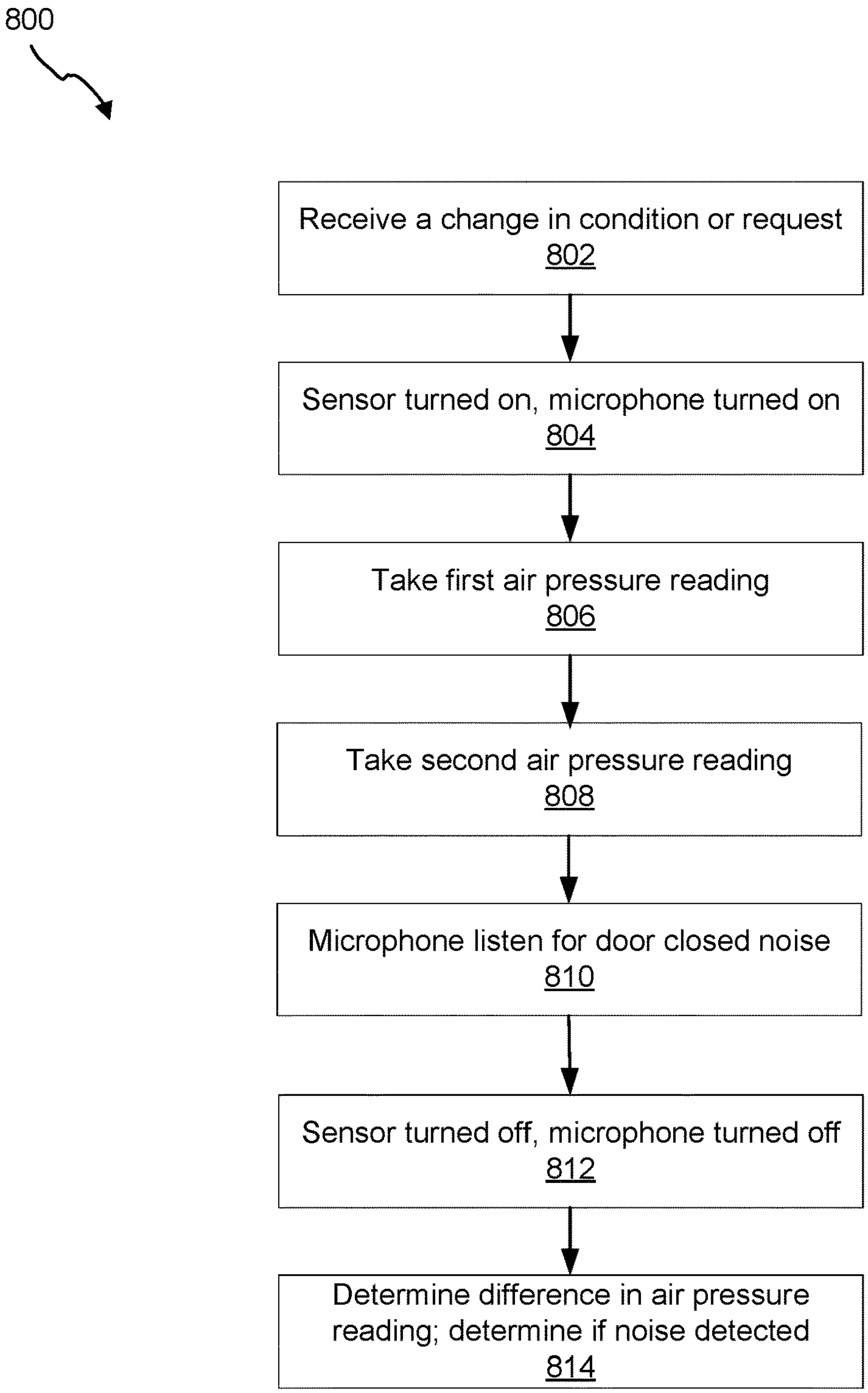
FIG. 7 illustrates an example flowchart of a method of determining whether a door is open or closed.

FIG. 7 illustrates a method 800 of determining whether a locking request can be completed. Determining whether the locking request can be completed includes determining whether the door is opened or closed. In some embodiments, the method 800 is implemented in a door open/close confirmation application 112 stored as instructions in the memory of an electronic lockset. The method 800 includes the operations 802, 804, 806, 808, 810, 812, and 814.

At operation 802, a change in condition of the door is detected, or an actuation request is received. Examples of a change in condition include an indication that the door has moved, that the lockset has changed from a locked position to an unlocked position, or a lock request is received from a user. For example, an accelerometer may measure a change in movement to determine that the door has moved. In another example, a magnetometer determines that the door has moved. An example of a request is a request received from a user to lock or unlock the lockset. For example, the request may be a code entered at the keypad or a request received from a mobile device.

At operation 804, the pressure sensor 514 is activated. In some embodiments, the pressure sensor 514 is turned on when a change in condition of the door or a request is received. This may allow the electronic lockset 110 to conserve energy as well as resources. In an example, the pressure sensor 514 is activated for anywhere from 0 to 5 seconds. In a further example, the sensor is activated from between 2 to 4 seconds. In these examples, the pressure sensor 514 takes a first pressure reading at the beginning of the time period, and again at the end of the time period. Then, the processing unit 212 can use the two pressure readings to determine if a change in air pressure is detected. In some examples, the sensor is activated until the electronic lockset receives an indication that the door has completed a change in state or has stayed in the same state for a set period of time. In some of these examples the pressure sensor continues to take readings periodically until it is instructed to stop.

The microphone 332 also activates when the pressure sensor 514 is activated. The microphone 332 may be activated for the same duration as the pressure sensor 514, for example, anywhere from 0 to 5 seconds, or for between 2 to 4 seconds. Similarly, in some embodiments, the microphone 332 is activated until there is an indication that the door has changed state or that the door has remained in one state for a predetermined amount of time.

At operation 806, a first air pressure reading is taken. The air pressure reading is of the enclosed room with which the electronic lockset 110 is associated. At operation 808, a second air pressure reading is taken. The second air pressure reading is taken after a predetermined amount of time. The predetermined amount of time is a time that allows a door to be closed. In other examples, the second air pressure reading is taken after the microphone detects a door closed noise.

In alternative embodiments, the air pressure sensor continuously takes air pressure readings periodically for a predetermined set of time or until specific events are detected. In some of these embodiments, the air pressure readings are tracked, and a change state is detected by a change in air pressure over time being over a set threshold.

At operation 810, the microphone listens for a door-closing noise. The noise may be the sound of a door hitting a door jamb, a latch bolt entering a strike plate, or other similar noise that a door makes when it is closed. In some examples, the microphone listens for a combination of sounds which are unique to the door closing and/or locking.

At operation 812, the pressure sensor 514 is deactivated and the microphone is also deactivated. In some examples, after the predetermined set of time or after an event is detected indicating that the door is no longer changing state, the sensors and/or microphone are deactivated. In some examples, only the pressure sensor is deactivated and the microphone remains active, for example to detect a possible change in condition (e.g., the change in condition described in operation 802).

At operation 814, a difference in air pressure between the first reading and the second reading is determined. In some examples, the difference in pressure is above a threshold, and the microphone detected a door-closed noise, then it is determined that the door is closed. In other examples, just the pressure readings are used. In alternative embodiments, operation 814 continuously takes air pressure readings periodically to detect a change in air pressure. The detected air pressure readings over time are used to check for changes greater than a set threshold indicating that the door has changed states.

If the difference in air pressure is lower than the threshold and/or the microphone did not detect a door-closed noise, then is determined that the door is not closed. The electronic lockset uses this information to report the door state to the user. Additionally, in alternative embodiments demining whether the door is closed relies solely on the microphone detecting sounds which indicates that the door was closed or opened.

Figure 8:
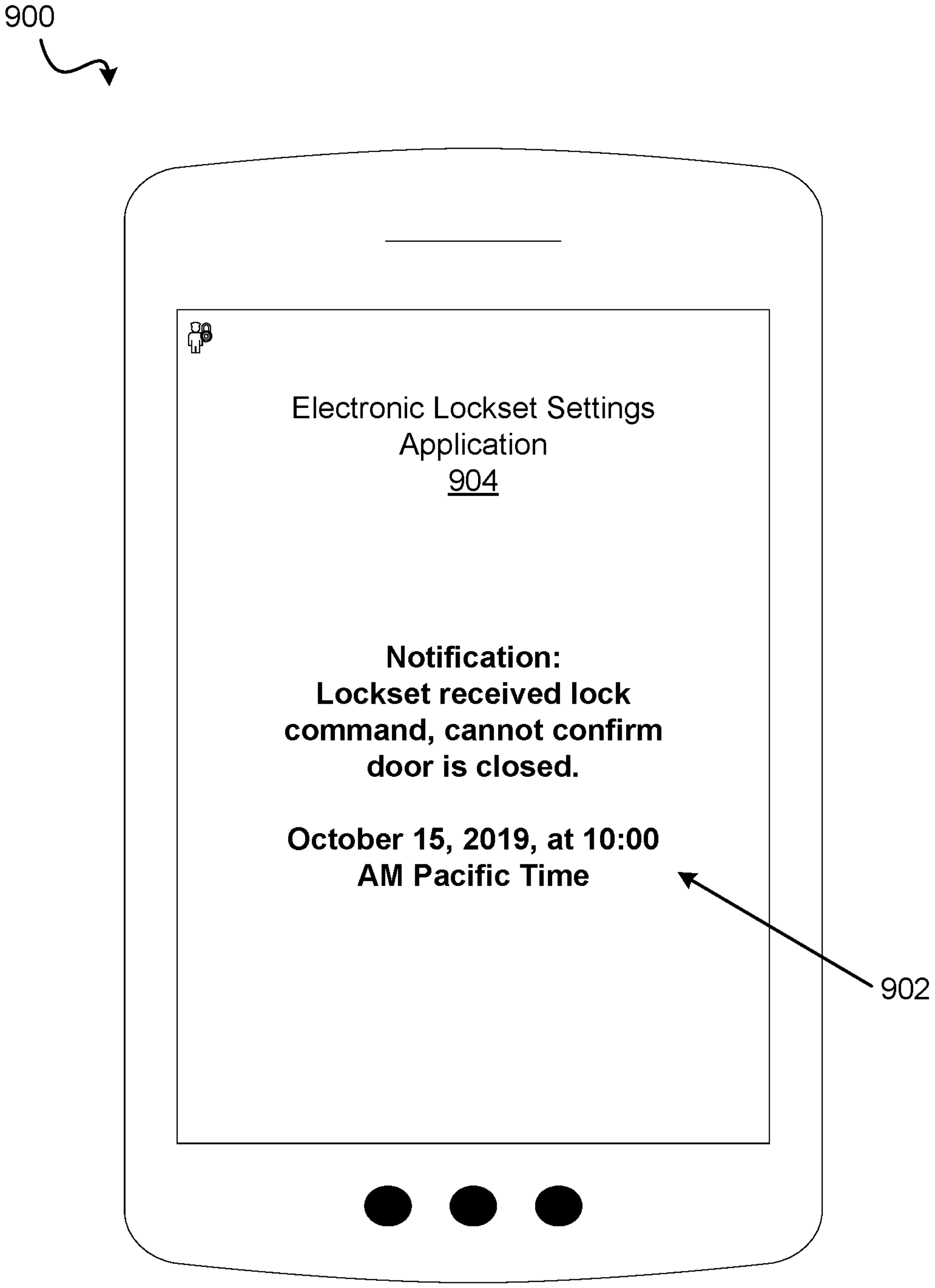
FIG. 8 illustrates an example user interface for an electronic lockset application.

FIG. 8 illustrates an example user interface 900 of a mobile device that may be communicatively connected to the electronic lockset 110. In this example, the electronic lockset 110 may be configured to transmit (e.g., via a wireless interface) a notification to the mobile device in response to a failed locking event. In this example, the user interface 900 of the mobile device presentable to the user displays a notification 902 indicating an attempted locking event that was not completed because it could not be determined that the door is closed. The notification may be sent as part of operation 710 as shown in FIG. 6, in which it cannot be determined that the door is closed. In the example shown, the mobile device of the user may receive a notification and a time of the attempted locking event.

The user can use the information from the notification to determine if the door needs to be manually checked to be assured that the door is closed and locked. If the door is not closed (and/or not locked), the user can close the door so the electronic lockset 110 can lock the door.

In some examples, an electronic lockset settings application 904 provides additional information to a user for example notifications about a change in state of a door, a successfully lock notification, and current door state information.

Figure 9:
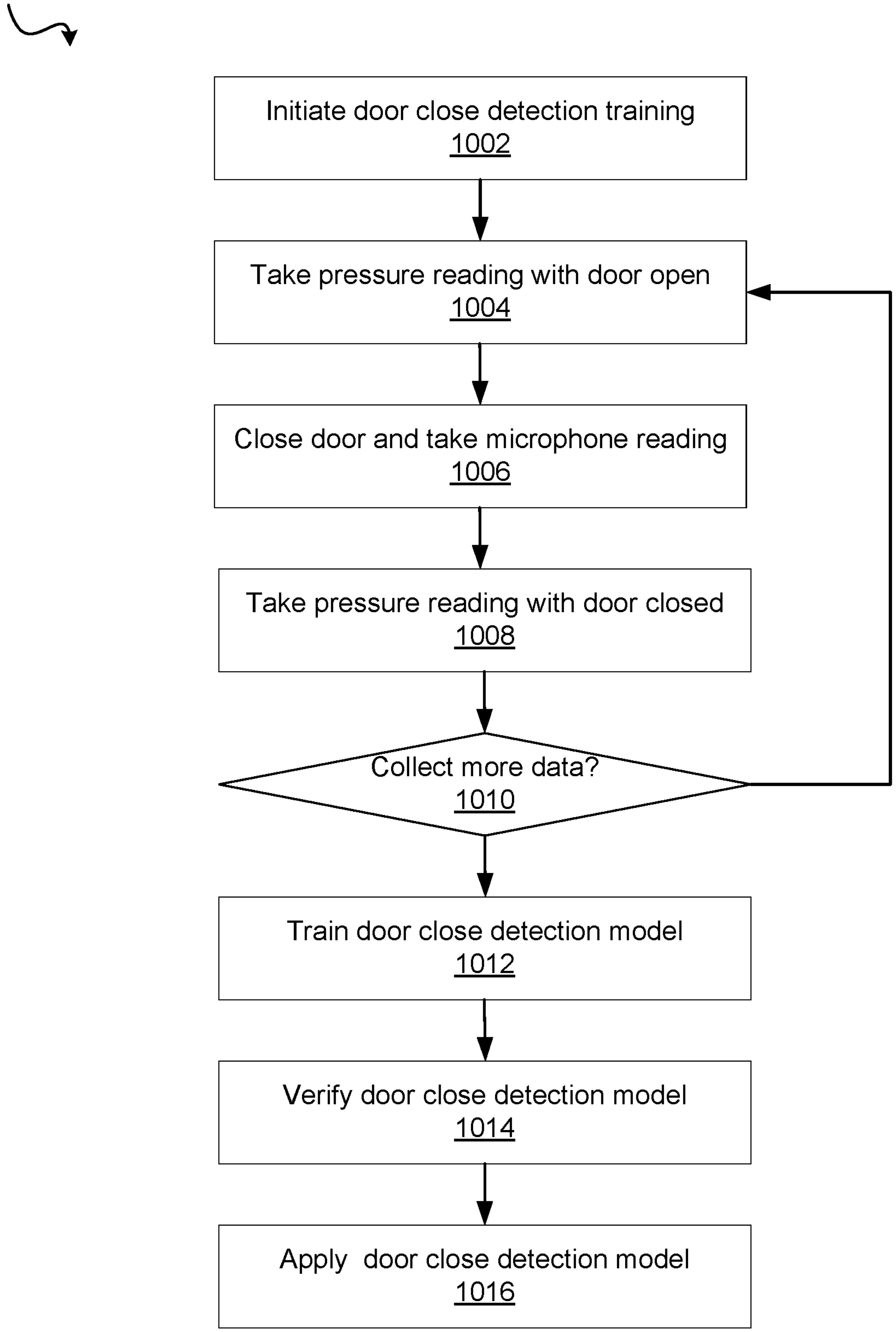
FIG. 9 illustrates an example flowchart of a method of training an electronic lockset.

FIG. 9 illustrates an example method 1000 of training the sensor on the lockset to determine if the door is open or closed. The sensor can be trained periodically as needed, for example, if the seasons change, if the pressure conditions change, or some other environmental change, the sensor may need to be retrained. In some examples, the method 1000 is used to calibrate the sensors and or microphone to detect a door close event. The method 1000 includes the operations 1002, 1004, 1006, 1008, 1010, 1012, 1014, and 1016.

The operation 1002 initiates door close detection training. In some embodiments, when an electronic lockset is installed, the user is notified to initiate the training for door close detection. In other examples, a user manually selects a setting to set up door close detection. In some examples, door close detection training relates to calibrating a change in pressure threshold for determining when a door is closed. In a typical example, a user is instructed either audibly or visually by either a connected computing device (e.g., the mobile device 200) or by the electronic lockset (e.g., the electronic lockset 110).

The operation 1004 takes an air pressure reading with the door open. In some embodiments, a user is instructed to open the door and provide an input indicating that the door is in an open position. In some embodiments, the user is instructed to open the door at different angles where the pressure sensor makes at least one reading at each angle.

The operation 1006 closes the door and takes a microphone reading. In some embodiments, a user receives instructions to close the door at least once. The microphone is turned on to detect sounds the door makes when closing. In some examples, a user is instructed to close the door multiple times using different levels of force. In some examples, a user is asked to lock and unlock the door one or more times while the microphone is turned on to detect the sounds of the lock actuating. In other examples, once the door is locked, the electronic lock automatically actuates the lock to extend and retract the bolt using a motor on the lockset.

The operation 1008 takes an air pressure reading with the door closed. While the door is closed, the air pressure sensor takes at least one air pressure reading. In some examples, the lock is actuated to move from unlocked to locked (manually and/or with the motor) and the air pressure sensor will take a reading with the door unlocked and another reading with the door locked.

The operation 1010 determines whether more data is required to train a model for detecting a door close event. In some examples, a user may be prompted to run through the different calibration steps in order to collect more data. In some examples, a user repeats the operations 1004, 1006, and 1008 a predetermined number of times. In other examples, the training application determines that more data is needed or that bad readings were made and will instruct the user or automatically repeat one or more operations to collect the required data. In further examples, the training application may operate to first test a model and decide to collect additional data if the model is unreliable for detecting changes in the door's state.

In some embodiments, the operations 1004-1008 require human interaction with a door. In some of these examples, a mobile application may instruct the user to perform the various actions to collect the necessary data to train a door close detection model. For example, the instructions can instruct a user to close and open a door at set times, use different levels of force to close the door, and leave the door open at various angles. In some embodiments, the data collection and training process continues as the door is used without the user being required to make any specific actions.

The operation 1012 trains a door close detection model. In some examples, the model checks for a change in air pressure above a threshold. In some examples, the model checks for a detected sound which indicates the door is closed. Further models include both a change in air pressure threshold and a detected sound. In still further examples, the data collected by the various sensors is provided to an algorithm for generating a machine learning model. In such examples, the algorithm will generate a model which looks at features for a specific door which are consistently detected during a door close event.

Optionally, the operation 1014 verifies the door close detection model. In some examples, after a model is created, it is verified. In some examples, a user is instructed to open and close a door and provide an input either to the electronic lock or a mobile application verifying that the door is in the indicated state. In some examples, the data collected from the successful or unsuccessful verification is used to further train the model. In some examples, a user may be asked to repeat one or more of the operations 1004, 1006, and 1008 in response to unsuccessful verification of a model. In other examples, a user may be asked to reboot and reconfigure the lock in response to unsuccessful verification. Additionally, a user may be asked to verify the model at predetermined increments. For example, a user may be asked to re-verify the model every month or year.

The operation 1016 applies the door close detection model. The operation 1016 applies the model to detect when the door is in a door-closed state. Applying the model includes receiving signals from the required sensors (for example, pressure readings, recorded sound) and determining the door state based on these signals. In some examples, applying the model includes using the model in the operation 814 illustrated in FIG. 7 and/or operation 704 illustrated in FIG. 6.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

I claim:

1. A wireless electronic lockset comprising:
- a processing unit;
- a locking bolt movable between a locked position and an unlocked position;
- a motor actuatable by the processing unit to move the locking bolt between the locked and unlocked positions;
- a sensor communicatively connected to the processing unit and configured to detect air pressure;
- a microphone communicatively connected to the processing unit and configured to detect a sound; and
- a movement detection mechanism configured to detect motion;
- wherein the processing unit is configured to receive a lock request and execute instructions to:
  - receive, from the sensor, air pressure signals;
  - detect an initial door opening based on a first change in the air pressure signals;
  - receive sound signals from the microphone;
  - determine whether a door is closed based at least in part on both a second change in the air pressure reflected in the air pressure signals and the sound signals; and
  - determine whether the locking bolt can be actuated based on whether the door is open or closed;
- wherein when the movement detection mechanism is triggered by motion, the movement detection mechanism actuates the sensor and the microphone to an active state such that the sensor and the microphone can communicate with the processing unit.

2. The wireless electronic lockset of claim 1, wherein the processing unit is further configured to:
- detect a first condition when the door is in an open state; and
- detect a second condition when the door is in a closed state.

3. The wireless electronic lockset of claim 1, further comprising a battery electrically connected to the processing unit and the motor.

4. The wireless electronic lockset of claim 1,
- wherein the movement detection mechanism is selected from a magnetometer and an accelerometer.

5. The wireless electronic lockset of claim 1, wherein the microphone is designed to detect the sound of a door-closing noise.

6. The wireless electronic lockset of claim 5, wherein the door closing noise may be either the sound of a door hitting a door jamb, or the sound of a latch bolt entering a strike plate.

7. A method of using a wireless electronic lockset, the method comprising:
- detecting movement from a movement detection mechanism in the electronic lockset;
- activating a sensor and a microphone in response to the detected movement;
- receiving a lock actuation request at the wireless electronic lockset;
- requesting air pressure readings from the sensor in the wireless electronic lockset;
- receiving air pressure signals from the sensor;
- detecting an initial door opening based on a first change in the air pressure signals;
- receiving sound signals from the microphone; and
- determining whether a door is closed based on both a second change in the air pressure signals and the sound signals.

8. The method of claim 7, the method further comprising:
- sending an actuation command to move a bolt between a locked position and an unlocked position when it is determined that the door is closed.

9. The method of claim 8, wherein after the actuation command is executed, providing a confirmation that the door is closed and locked.

10. The method of claim 9, wherein the confirmation that the door is closed and locked is selected from:
- (1) an audible confirmation; and
- (2) a message sent to a mobile device.

11. The method of claim 7, the method further comprising:
- sending an alert command when the door is determined to not be closed.

12. The method of claim 11, wherein a confirmation that the door is not closed is selected from:
- (1) an audible confirmation; and
- (2) a message sent to a mobile device.

13. The method of claim 7, wherein the movement detection mechanism is selected from:
- (1) a magnetometer; and
- (2) an accelerometer.

14. A wireless electronic lockset system comprising:
- a door assembly comprising:
  - an external assembly comprising a keypad;
  - a latch assembly comprising a bolt movable between a locked position and an unlocked position; and
  - an internal assembly comprising:
    - a processing unit;
    - a motor actuatable by the processing unit to move the bolt between the locked and unlocked positions; and
    - a movement detection mechanism, at least one sensor, and a microphone;
- wherein when the movement detection mechanism is triggered by motion, the movement detection mechanism actuates the sensor and the microphone to an active state such that the sensor and the microphone can communicate with the processing unit,
- wherein the at least one sensor is capable of detecting air pressure in response to a lock actuation request from the processing unit, and the processing unit is capable of determining whether the motor can be actuated based on whether a door is closed as determined by both the air pressure and the microphone, wherein the microphone is capable of determining, at least in part, whether the door transitioned from open to closed.

* * * * *